(12) United States Patent
Zalusky et al.

(10) Patent No.: US 8,747,069 B2
(45) Date of Patent: Jun. 10, 2014

(54) ADJUSTABLE HEIGHT PRESSURE SENSING PORT

(75) Inventors: Leigh Zalusky, Vacaville, CA (US); Erick Rickards, Rocklin, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 550 days.

(21) Appl. No.: 13/071,568

(22) Filed: Mar. 25, 2011

(65) Prior Publication Data
US 2012/0243993 A1 Sep. 27, 2012

(51) Int. Cl.
*F03D 7/00* (2006.01)
(52) U.S. Cl.
USPC .................................................. 416/61; 416/1
(58) Field of Classification Search
USPC .......................... 73/714, 717, 756; 416/62, 61
See application file for complete search history.

(56) References Cited

U.S. PATENT DOCUMENTS

| | | | | |
|---|---|---|---|---|
| 4,279,162 A | * | 7/1981 | Neill et al. ........................ | 73/746 |
| 4,885,940 A | * | 12/1989 | Huang ............................. | 73/744 |
| 5,111,699 A | * | 5/1992 | Walstra et al. ................... | 73/754 |
| 5,119,680 A | * | 6/1992 | Myhre ............................. | 73/756 |
| 5,858,224 A | * | 1/1999 | Schwandt et al. ............... | 210/90 |
| 7,437,919 B1 | * | 10/2008 | Wu ................................... | 73/146 |
| 2007/0286728 A1 | * | 12/2007 | Hotto ................................. | 416/1 |
| 2008/0223141 A1 | * | 9/2008 | Schmid et al. ................... | 73/721 |
| 2009/0129925 A1 | * | 5/2009 | Vronsky et al. ................. | 416/61 |
| 2010/0101328 A1 | * | 4/2010 | Enevoldsen et al. ............ | 73/714 |
| 2011/0268570 A1 | * | 11/2011 | Loganathan et al. ........... | 416/31 |

* cited by examiner

*Primary Examiner* — Nathaniel Wiehe
*Assistant Examiner* — Eldon Brockman
(74) *Attorney, Agent, or Firm* — Banner & Witcoff, Ltd.

(57) ABSTRACT

An adjustable height pressure sensing port arrangement is provided. In some example, the pressure sensing port may be arranged on an airfoil, such as wind turbine blade. The pressure sensing port arrangement may include a pressure sensing port body and a spring arranged within the port body. The pressure sensing port arrangement may further include a pressure sensing port arranged vertically above the spring and a rotatable capture disk arranged vertically above the port. The capture disk may be rotated to adjust a height of the capture disk. Further, the spring may be arranged to force an alignment feature of the pressure sensing port into an alignment feature on the rotatable capture disk in order to secure the port and capture disk in place.

20 Claims, 5 Drawing Sheets

ADJUSTABLE HEIGHT PRESSURE SENSING PORT

TECHNICAL FIELD

The invention relates generally to a pressure sensing port arrangement that is adjustable. In some examples, the invention relates to a pressure sensing port arrangement having an adjustable height.

BACKGROUND

Wind turbines rely on aerodynamic lift to turn a rotor and generate electricity. In order to control the aerodynamic lift and optimize performance of various airfoils (e.g., wind turbine blades), it would be beneficial to determine the lift generated by individual airfoils and collectively for the entire wind turbine. In one example, pressure sensors are positioned along a length of one or more turbine blades. The pressure sensors may be contained within ports or orifices positioned along the blades. However, installation of these pressure sensing ports may be difficult and, in some instances, the pressure sensing ports may protrude outward from the blade surface. That is, conventional port arrangements may not be flush with the surface of the airfoil. The protrusion of the pressure sensing ports may increase wind resistance over the airfoil and reduce performance (e.g., power generation), efficiency, etc. of the airfoil. Further, in some conventional arrangements, different ports of varying heights may be used to provide port arrangements having an appropriate height for the position on the airfoil. This may be costly and inefficient to install different ports. Accordingly, a pressure sensing port arrangement having an adjustable height would be advantageous.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the conventional systems described above, and to overcome other limitations that will be apparent upon reading and understanding the present specification, aspects of the disclosure are directed to an adjustable pressure sensing port arrangement for use in an airfoil.

In at least some aspects, one or more pressure sensing port arrangements may be used along a length of an airfoil, such as a wind turbine blade. The pressure sensing port may include a port body, a spring, a pressure sensing port and an adjustable capture disk. The adjustable capture disk may have a threaded region corresponding to a threaded region on an interior of the port body. The capture disk may be configured to rotate in order to increase or decrease a height of the capture disk relative to the port body, and thus, in some examples, an overall height of the pressure sensing port arrangement.

In some arrangements, the pressure sensing port may include one or more notches configured to mate with one or more protrusions extending outward from the port body. The notches and protrusions arrangement may aid in reducing or eliminating rotation of the port relative to the port body.

In at least some aspects, the pressure sensing port may include a first alignment feature and the capture disk may include a second, corresponding alignment feature. The first alignment feature may include a protrusion and may be received in the recess or aperture forming the second alignment feature in order to align the port with the capture disk and maintain a position of the capture disk relative to the port and port body.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

The reader is advised that the figures are not necessarily drawn to scale.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the present disclosure are directed to a pressure sensing port having an adjustable height. Pressure sensing ports may be arranged on an airfoil, such as a wing, blade, rotor, etc., such as a blade of a wind turbine. Pressure sensing may be used to evaluate the aerodynamic characteristics of the airfoil and, in some examples, to aid in adjusting a position of the airfoil in order to maximize or improve efficiency and/or performance. Thus, the pressure readings along portions of the blade provide information that may be used to adjust operation, position, etc. of the blades. In order to improve or maximize the aerodynamic characteristics of the airfoil, it is desirable for the airfoil surface to be smooth and/or free of protrusions, etc. that may increase wind resistance across the surface of the airfoil. Accordingly, it is desirable for pressure sensing ports to be flush with an outer surface of the airfoil. In order to ease installation of the pressure sensing ports and to maximize smoothness of the airfoil surface, a pressure sensing port having an adjustable height, as described herein, may be used. In some examples, the height of the pressure sensing port may be adjusted upon installation of the port. This not only aids in ensuring that the pressure sensing port is flush with the airfoil surface, but may also allow for efficiency and cost savings in that ports of varying heights are not needed. The ports may instead be adjusted to a desired height. Also, adjustability of the height during installation may allow for ease of installation.

Figure 1:
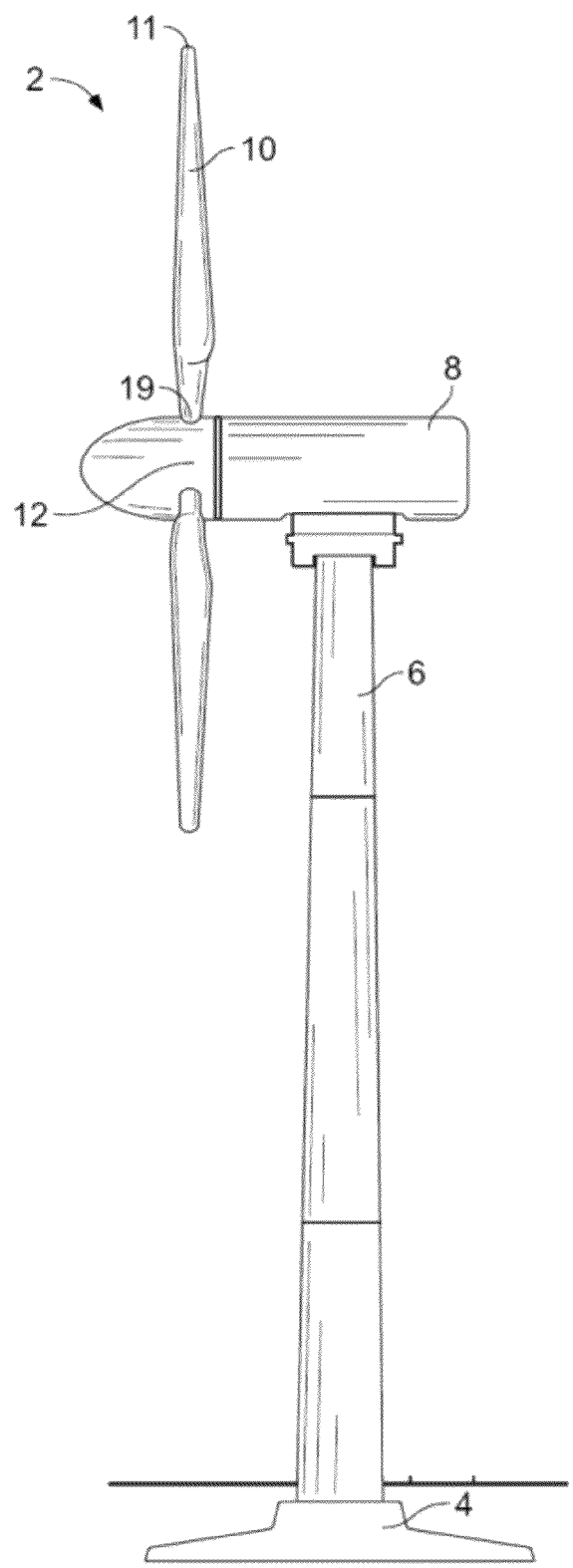
FIG. 1 is a side view of a wind turbine according to at least some aspects of the present disclosure.

FIG. 1 shows an example wind turbine 2 with which aspects described herein may be implemented. The wind turbine 2 is shown on a foundation 4 with a tower 6 supporting a nacelle 8. One or more blades 10 are attached to a hub 12. In some examples, the blades 10 may be connected to the hub 12 via a bolt flange (not shown in FIG. 1). In the depicted arrangement, the wind turbine 2 includes three blades 10. However, more or fewer blades 10 may be used without departing from the invention. The hub 12 is connected to a gear box, a generator, and other components within the nacelle 8. The blades 10 may have a fixed length or may be of the variable length-type, e.g., telescopic. As shown in FIG. 1, each blade 10 includes a root or base portion 19 and a tip portion 11. In arrangements having a variable length blade 10, the tip portion 11 may be movable with respect to the root portion 19 so as to controllably increase and/or decrease the length of the rotor blade 10, and in turn, respectively increase and decrease the swept area of the rotor blades 10. Any desirable drive system, such as a screw drive, a piston/cylinder, or a pulley/winch arrangement may be used to move the tip portion 11 with respect to the root portion 19. Such drive systems are described in U.S. Pat. No. 6,902,370, which is hereby incorporated by reference. The wind turbine 2 further includes a yaw drive and a yaw motor, and may include a pitch control system, not shown.

Figure 2:
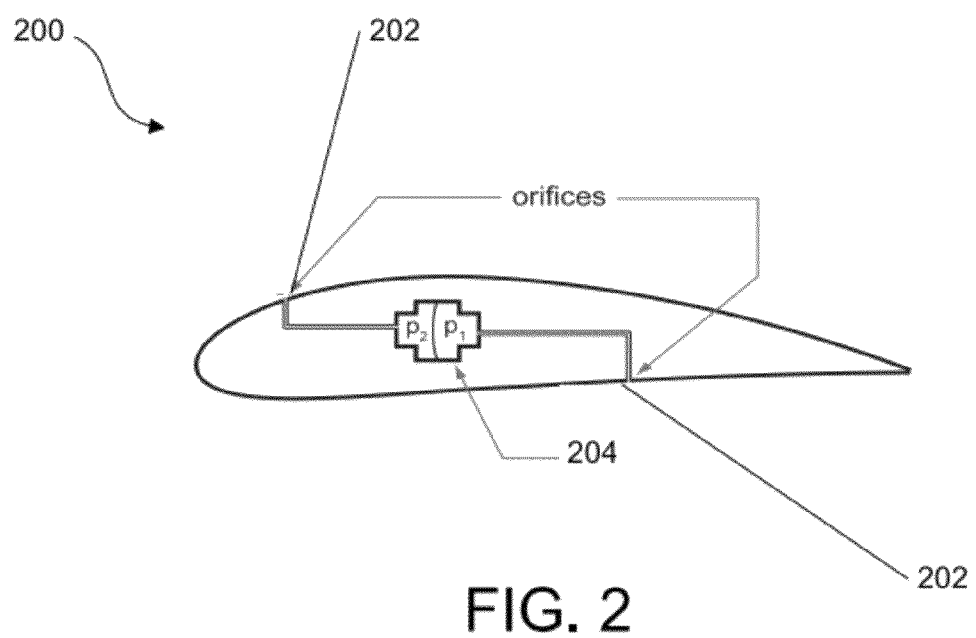
FIG. 2 is a cross sectional view of one example airfoil having an arrangement of one or more pressure sensing ports along a length of the airfoil according to at least some aspects of the present disclosure.

FIG. 2 illustrates one example cross section of an airfoil 200 having one or more pressure sensing ports 202. Although two pressure sensing ports 202 are shown in FIG. 2, more pressure sensing ports 202 may be arranged along a length of the airfoil 200 without departing from the invention. Additionally, the position of the two pressure sensing ports 202 is merely illustrative. The pressure sensing ports 202 may be arranged at any location along the airfoil. The pressure sensing ports 202 are, in some examples, connected to a pressure transducer 204 which may measure or calculate pressure differentials between the two pressure sensing ports 202. In some examples, multiple pressure transducers 204 may be used to determine pressure differentials across the plurality of pressure sensing ports 202 arranged along a length of the airfoil.

Figure 3:
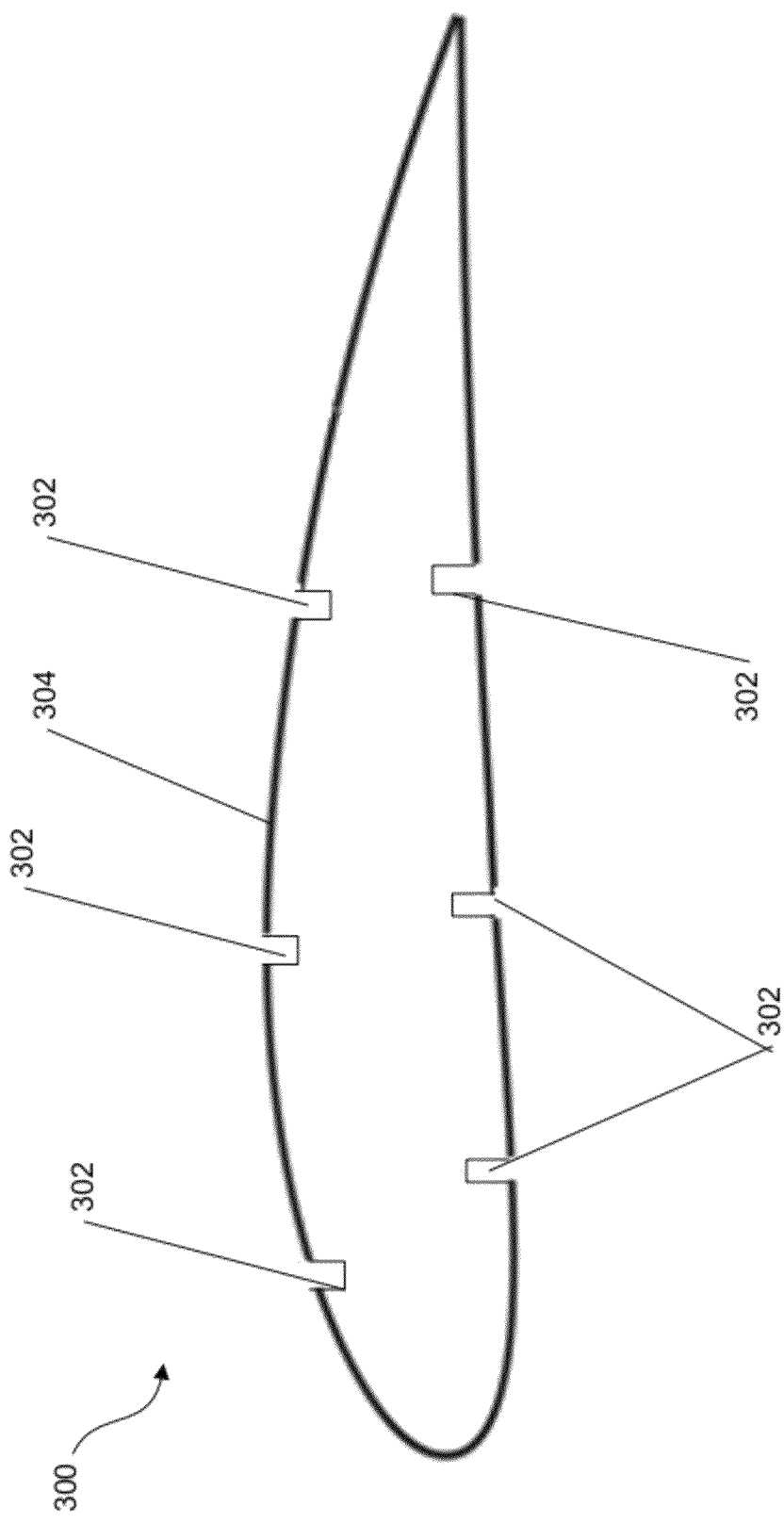
FIG. 3 is cross sectional view of another example airfoil having a plurality of pressure sensing ports arranged along a length of the airfoil according to at least some aspects of the present disclosure.

FIG. 3 illustrates another example airfoil 300 having pressure sensing ports 302 embedded within the airfoil. In the airfoil arrangement of FIG. 3, six pressure sensing ports 302 are arranged along a length of the airfoil. More or fewer pressure sensing ports 302 may be used without departing from the invention. In some examples, the pressure sensing ports 302 may be connected to one or more pressure transducers (not shown in FIG. 3) to measure pressure differential between two ports on the airfoil, as described above.

The pressure sensing ports 302 embedded in the airfoil 300 may be installed during manufacture of the airfoil 302 or may be installed during installation of the airfoil 300 (e.g., the ports 302 may be inserted into a wind turbine blade during installation of the blade on the hub, etc.). During installation, it may be desirable for an upper surface of the pressure sensing port 302 to be flush with a surface of the airfoil 300, such as surface 304, to aid in reducing wind resistance over the surface 304 of the airfoil 300. Because conventional ports can be difficult to embed in the airfoil in a manner in which port will be flush with the airfoil 300, an adjustable port, such as the port described herein, may be used.

Figure 4:
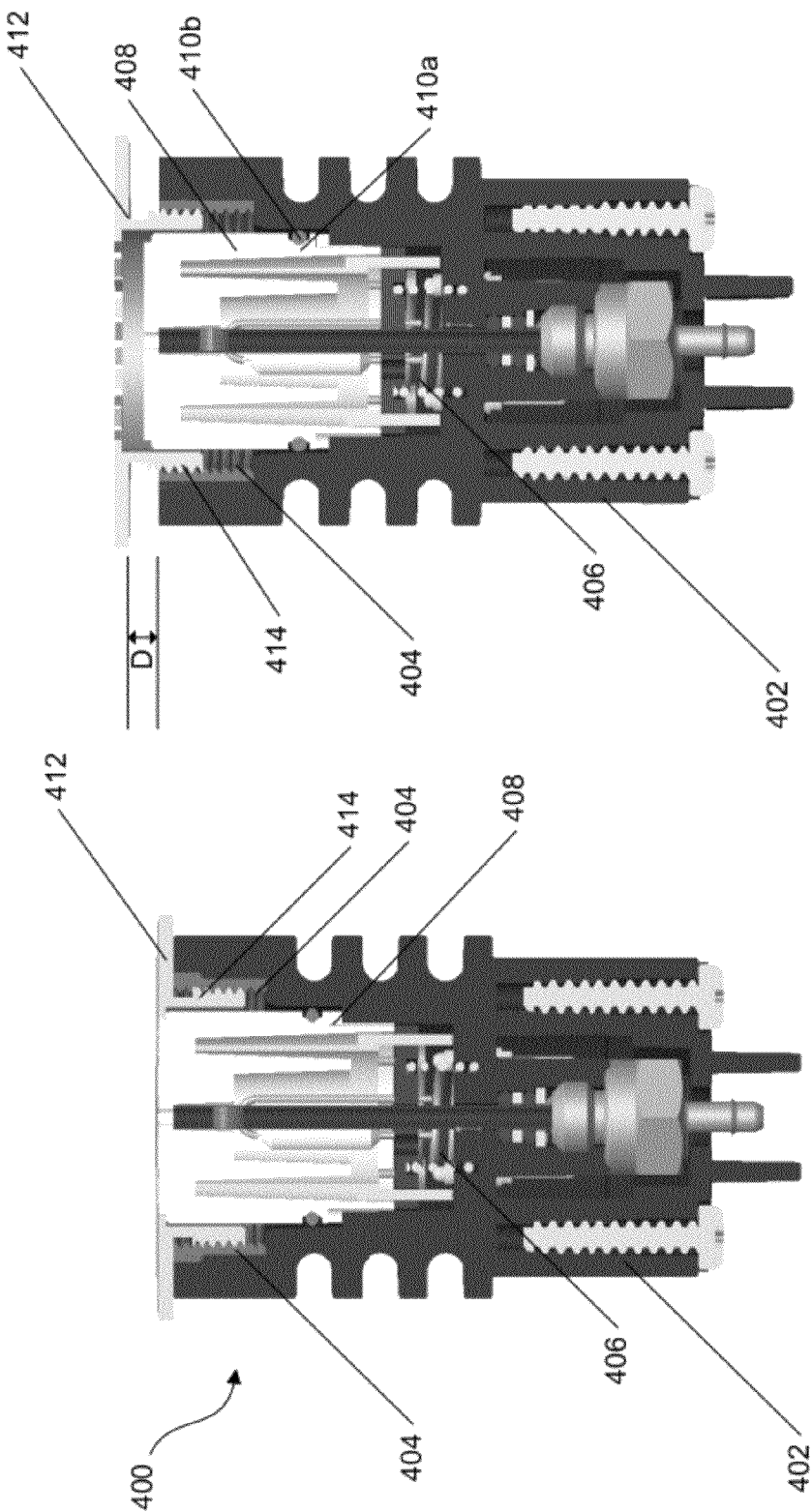
FIG. 4A is a cross sectional view of one example adjustable pressure sensing port arrangement having a first height according to one or more aspects of the present disclosure.
FIG. 4B is a cross sectional view of the example adjustable pressure sensing port arrangement of FIG. 4A having a second height different from the first height according to one or more aspects of the present disclosure.

FIGS. 4A and 4B illustrate one example adjustable height port arrangement 400. The example port arrangement 400 is shown in cross section to illustrate example interior components of the port arrangement 400. The port arrangement 400 generally includes a port body 402. The port body 402 may, in some examples, house some or all of the remaining components of the adjustable height port arrangement 400. The port body may be formed of any suitable material, such as various plastics, ceramics, metals, composites, etc. In some arrangements, the port body 402 may include a threaded upper portion 404. The threaded upper portion 404 may include threads on an interior surface of the port body 402. This threaded region 404 will be discussed more fully below.

The adjustable height port arrangement 400 may also include a spring 406 arranged within the port body 402. The spring 406 may be positioned vertically below a port 408. In some examples, the port 408 may be formed of any suitable material, such as various plastics, ceramic, composites, etc. The port 408 may include an opening or aperture in a top surface through which air may pass in order to sense a pressure. The port 408 may include one or more notches 410a that are configured to align with corresponding protrusions 410b on the port body 402. The notches and protrusions are configured to reduce or eliminate rotation of the port 408 within and relative to the port body 402. This will aid in ease of installation and adjustment of the height of the port arrangement 400, as will be discussed more fully below.

The notches 410a and protrusions 410b may be any suitable size, shape, configuration, etc. That is, the notches 410a and protrusions 410b may be substantially circular or semi-circular, square, rectangular, octagonal, hexagonal, and the like. In the example arrangement of FIGS. 4A and 4B, two notches 410a and two corresponding protrusions 410b are used to maintain the position of the port 408 relative to the port body 402. However, more or fewer notches 410a and protrusions 410b may be used without departing from the invention. Although the arrangement 400 includes notches in the port 408 and protrusions in the port body 402, an alternate arrangement may be used in which notches are formed in the port body 402 and protrusions extend outward from the port 408.

The notches 410a and protrusions 410b are generally arranged near a lower portion of the port 408 in FIGS. 4A and 4B. Additionally or alternatively, the notches 410a and corresponding protrusions 410b may be arranged in a different location on the port 408 and port body 402. For instance, the notches 410a may be formed near a middle region of the port 408 and corresponding protrusions 410b may align with the notches 410a on the port body 402. In still other examples, the notches 410a may be formed near a top region of the port 408 with corresponding protrusions 410b formed in the port body 402.

In some arrangements, the port 408 may have a top surface including an alignment feature, as will be discussed more fully below. The port 408 may further be movable in a vertical direction, as will be discussed more fully below.

The adjustable height port arrangement 400 may further include a capture disk 412. In some examples, the capture disk may include an alignment feature corresponding to the alignment feature on the top surface of the port 408. These alignment features will be discussed more fully in conjunction with FIG. 5.

The capture disk 412 may include a threaded region 414 that corresponds to the threaded region 404 of the port body 402. Accordingly, a height of the capture disk 412 may be adjusted by rotating the capture disk 412 within the port body 402. FIG. 4A illustrates the capture disk 412 being in contact with the port body 402. FIG. 4B illustrates the capture disk 412 being a distance D above the port body 402. This height adjustment may be made by rotating the capture disk 412 to raise or lower the height of the capture disk 412 relative to the port body 402 in order to make the port arrangement 400 flush or substantially flus with an outer surface of the airfoil.

Figure 5:
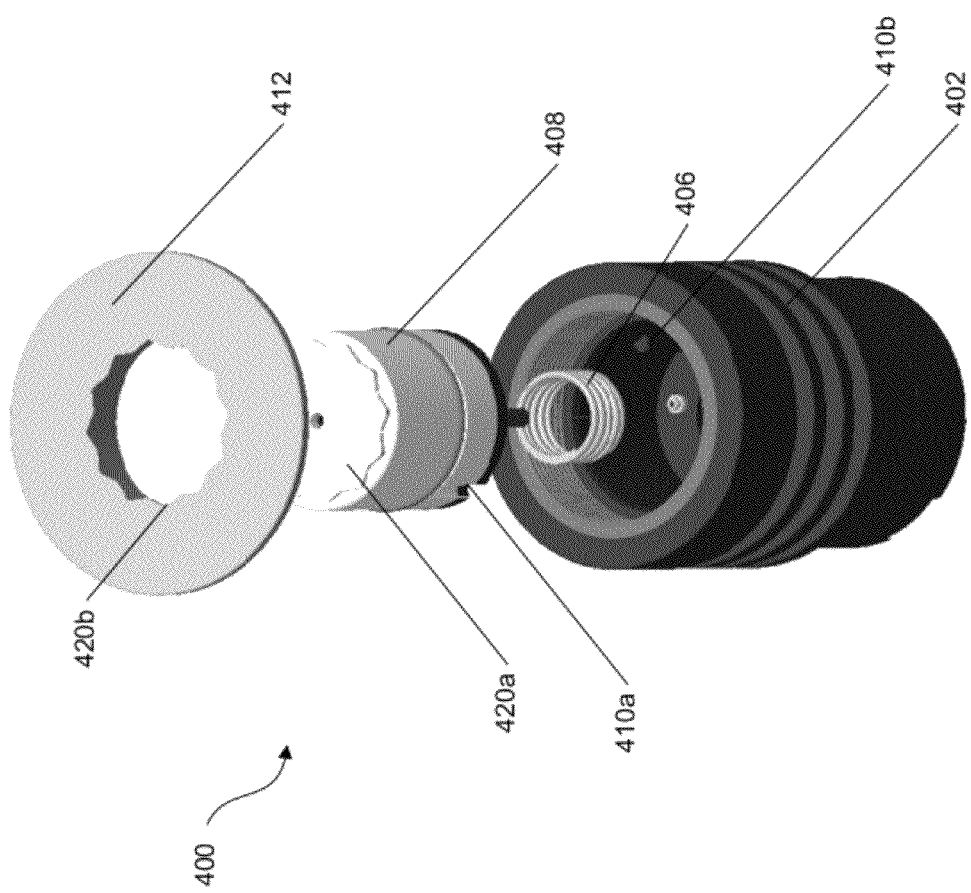
FIG. 5 is an exploded view of the adjustable pressure sensing port arrangement of FIGS. 4A and 4B according to one or more aspects of the present disclosure.

FIG. 5 is an exploded view of the adjustable height port arrangement 400 of FIGS. 4A and 4B. The components of the port arrangement 400 are shown in a vertical arrangement in which they are generally assembled. For instance, the spring 406 is positioned within the port body 402. The port 408 may be arranged vertically above and, in some examples, in contact with the spring 406. The port 408 is arranged within the port body 402 and the notches 410a formed in the port 408 are shown. Notches 410a may be arranged on one or more sides or regions of the port 408 and may align with protrusions 410b formed in the port body 402 to reduce or eliminate rotation of the port 408 relative to the port body 402. The capture disk 412 is arranged vertically above the port 408.

The alignment features 420a, 420b are shown in FIG. 5. That is, the upper surface of the port 408 includes a first alignment feature 420a. In the arrangement of FIG. 5, the first alignment feature 420a may be a generally star shaped protrusion extending outward from the top surface of the port 408. Although the first alignment feature 420a is shown as substantially star shaped, various other shapes, such as square, rectangular, triangular, octagonal, hexagonal, and the like, may be used without departing from the invention. The first alignment feature 420a is arranged to mate with a second alignment feature 420b formed in the capture disk 412. The second alignment feature 420b shown is a generally star shaped aperture extending through the capture disk 412. The second alignment feature 420b may also be any other suitable shape to correspond to the first alignment feature 420a on the port 408. The second alignment feature 420b is illustrated as an aperture extending completely through the capture disk 412. In some examples, a depth of the first alignment feature may be substantially equal to the thickness of the capture disk 412. However, in some arrangements, the second alignment feature 420b may extend only partially into the capture disk 412.

Although the first alignment feature 420a on the port 408 is illustrated as a protrusion while the second alignment feature 420b is illustrated as an aperture on the capture disk 412, an alternate arrangement may be used wherein the first alignment feature on the port 408 is a recess in the top surface of the port 408 while the second alignment feature 420b is a protrusion on the capture disk 412.

In some examples, in a static position of the adjustable height port arrangement 400, the spring 406 is not in compression. The spring 406 may be compressed in order to adjust the height of the port arrangement 400 (e.g., adjust the height of the capture disk 412) and, when released, may force the port 408 into the capture disk 412 in order to maintain position of the capture disk 412.

For instance, in some examples, adjustment of the height of the port arrangement 400 may be performed by rotating the capture disk 412 to adjust the height of the capture disk 412. As discussed above, adjustment of this height (such as, on installation) may aid in installing the port arrangement 400 into the airfoil such that the port arrangement 400, and in particular, a top surface of the capture disk 412, is flush with an outer surface of the airfoil. As discussed, this may reduce wind resistance across the airfoil surface and improve performance, efficiency, etc.

In a static position, the alignment features 420a, 420b may be aligned with each other and the first alignment feature 420a on the port 408 may be received in the second alignment feature 420b on the capture disk 412. Accordingly, in order to rotate the capture disk 412 and adjust the height of the capture disk 412, the port 408 may be forced out of the aligned position (e.g., forced vertically downward, away from the capture disk 412). This may compress the spring 406. Once the port 408 is free of the capture disk 412, the capture disk 412 may be rotated until a desired height is achieved. Once a desired height is achieved, the port 408, and thus the spring 406, may be released and the spring 406 may force the port 408 upward, into the capture disk 412. The force of the spring 406 may aid in aligning the first alignment feature 420a and the second alignment feature 420b and may maintain the position of the port 408 relative to the capture disk 412. Accordingly, release of the spring 406 and port 408 may lock in place the position, and thus the height, of the capture disk 412. To lower the port 408, an application of a downward force greater than the force of the spring may be required.

Although generally described in conjunction with a wind turbine, the above described system may be used with a variety of applications. For instance, the system and method may be implemented with helicopter rotors, airplane wings, and the like. Additionally or alternatively, the system and method described herein may be applied to non-aerodynamic applications.

The disclosed invention is not limited by the above description and many variations of the above disclosed innovations will be evident to one skilled in the art.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A wind turbine, comprising:
   a hub having a plurality of wind turbine blades connected thereto;
   a pressure sensing port arrangement positioned on at least one of the plurality of wind turbine blades, the pressure sensing port arrangement including a port body and a pressure sensing port within the port body, the pressure sensing port having an adjustable height; and
   a plurality of notches arranged on the port; and
   a plurality of protrusions arranged on the port body and configured to correspond to and align with the plurality of notches arranged on the port.

2. The wind turbine of claim 1, wherein adjustment of the height of the pressure sensing port arrangement may be performed during installation of the pressure sensing port arrangement into the at least one of the plurality of wind turbine blades.

3. The wind turbine of claim 2, wherein the height of the pressure sensing port arrangement may be adjusted until it is flush with a surface of the at least one of the plurality of wind turbine blades.

4. The wind turbine of claim 1, wherein the pressure sensing port arrangement includes a spring and a threaded height adjustment.

5. The wind turbine of claim 4, wherein the spring aligns the pressure sensing port with the threaded height adjustment and secures the pressure sensing port and threaded height adjustment in place.

6. The wind turbine of claim 1, wherein the pressure sensing port body is bonded to the at least one of the plurality of wind turbine blades.

7. A wind turbine, comprising:
a foundation;
a hub connected to the foundation having a plurality of wind turbine blades connected thereto, at least one wind turbine blade having at least one pressure sensing port arrangement positioned on the at least one wind turbine blade, the pressure sensing port arrangement including a pressure sensing port arranged within a pressure sensing port body,
wherein the at least one pressure sensing port arrangement is embedded in the at least one wind turbine blade and wherein a height of the pressure sensing port arrangement is adjustable to align the height of the pressure sensing port arrangement with an outer surface of the at least one wind turbine blade;
an adjustable, threaded capture disk arranged above the pressure sensing port body, wherein the adjustable threaded capture disk is rotatable to allow adjustment of a height of the pressure sensing port arrangement; and
a first alignment feature on the pressure sensing port and a corresponding second alignment feature on the adjustable, threaded capture disk, wherein the first alignment feature includes a protrusion extending outward from a top surface of the pressure sensing port and the second alignment feature includes an aperture formed in the threaded capture disk.

8. The wind turbine of claim 7, wherein adjustment of the height of the pressure sensing port arrangement may be performed during installation of the pressure sensing port arrangement into the at least one wind turbine blade.

9. The wind turbine of claim 8, wherein the height of the pressure sensing port arrangement may be adjusted until it is flush with a surface of the at least one wind turbine blade.

10. The wind turbine of claim 7, wherein the pressure sensing port arrangement further includes a spring.

11. The wind turbine of claim 10, wherein the spring aligns the first alignment feature of the pressure sensing port with the second alignment feature of the threaded capture disk and secures the pressure sensing port and threaded capture disk in place.

12. The wind turbine of claim 7, wherein the pressure sensing port body is bonded to the at least one of the plurality of wind turbine blades.

13. A pressure sensing port arrangement, comprising:
a pressure sensing port body;
a spring arranged within the pressure sensing port body;
a pressure sensing port arranged within the pressure sensing port body and vertically above the spring;
an adjustable, threaded capture disk arranged above the pressure sensing port body, wherein the threaded capture disk mates with corresponding threads on an interior of the pressure sensing port body and is rotatable to allow adjustment of a height of the pressure sensing port arrangement; and
a first alignment feature on the pressure sensing port and a corresponding second alignment feature on the adjustable, threaded capture disk, wherein the first alignment feature includes a protrusion extending outward from a top surface of the pressure sensing port and the second alignment feature includes an aperture formed in the threaded capture disk.

14. The pressure sensing port arrangement of claim 13, wherein adjustment of the height of the pressure sensing port arrangement may be performed during installation of the pressure sensing port arrangement into a blade of a wind turbine.

15. The pressure sensing port arrangement of claim 14, wherein the height of the pressure sensing port arrangement may be adjusted until it is flush with a surface of the blade of the wind turbine.

16. The pressure sensing port arrangement of claim 13, wherein the spring aligns the first alignment feature of the pressure sensing port with the second alignment feature of the threaded capture disk and secures the pressure sensing port and threaded capture disk in place.

17. The pressure sensing port arrangement of claim 13, wherein the first alignment feature and the second alignment feature are substantially star shaped.

18. The pressure sensing port arrangement of claim 13, wherein the pressure sensing port body is bonded to a blade of a wind turbine.

19. The pressure sensing port arrangement of claim 13, wherein the pressure sensing port arrangement includes a plurality of notches configured to mate with corresponding protrusions arranged on an interior surface of the port body.

20. The pressure sensing port arrangement of claim 13, wherein the pressure sensing port is movable in a vertical direction.

* * * * *